United States Patent [19]

Belfiore

[11] 4,231,161
[45] Nov. 4, 1980

[54] ALIGNMENT TOOL
[76] Inventor: Flavio Belfiore, 36 Maybury Ct., Staten Island, N.Y. 10306
[21] Appl. No.: 31,327
[22] Filed: Apr. 18, 1979
[51] Int. Cl.³ .............................................. G01B 3/30
[52] U.S. Cl. ................................... 33/181 R; 29/271; 33/412
[58] Field of Search ............... 29/271; 33/412, 181 R, 33/180 R, 182, 286

[56] References Cited
U.S. PATENT DOCUMENTS

| | | | |
|---|---|---|---|
| 2,256,527 | 9/1941 | Ring | 33/181 |
| 2,516,854 | 8/1950 | Christian | 33/180 R |
| 2,624,944 | 1/1953 | Pujda | 33/180 R |
| 2,714,255 | 8/1955 | Glazer | 33/180 R |
| 3,187,439 | 6/1965 | Leach | 33/181 R |

Primary Examiner—Harold D. Whitehead
Attorney, Agent, or Firm—Hopgood, Calimafde, Kalil, Blaustein & Lieberman

[57] ABSTRACT

An alignment tool for aligning the pulleys of a belt drive in three planes. The device includes a clamp releasably attached to each pulley which mounts a member extending normally to the face of each pulley. Each member has a universal joint at each end and an adjustable link joins the universal joints. Slidable guides oppositely disposed on each side of the universal joints indicate alignment of the pulleys in two planes when the faces of the guides are parallel. The device may also be used to determine if the pulleys have become angularly misaligned.

5 Claims, 3 Drawing Figures

ALIGNMENT TOOL

BACKGROUND AND SUMMARY OF THE INVENTION

This invention relates generally to a device for aligning pulleys of a belt drive system. In the past, such pulleys have been aligned by the use of a cord line or straight edge for center alignment. These measurements must be taken accurately at four points of the pulley; at the top, bottom, and each side of the pulleys. Angular alignment requires the use of specialized gauges and instruments. These methods were time-consuming; less than completely accurate; unreliable in that when one alignment was corrected, the other alignments may change; relatively costly and required specially trained people.

Generally speaking, in accordance with the invention, a device for aligning the pulleys of a belt drive is provided. The device includes clamp means for attachment to each of the pulleys which mounts a member normal to the face of each pulley. Each member mounts a universal joint and an adjustable link joins the universal joints. Guide members on each side of the universal joints are used to align the pulleys along their center lines. A line inscribed along the elements of the device permits accurate angular adjustment of the pulleys.

Accordingly, it is an object of this invention to provide an improved device for aligning the pulleys of a belt drive system.

It is another object of this invention to provide an alignment device for belt pulleys, that is simple and relatively quick to use.

It is another object of this invention to provide an alignment device for belt drive pulleys that may be used by relatively unskilled operators.

It is another object of this invention to provide an alignment device for belt drive pulleys that is accurate.

Still other objects of this invention will become apparent upon a reading of the detailed specification to follow.

BRIEF DESCRIPTION OF THE DRAWINGS

In order to better understand the invention, reference is made to the following drawings, taken in connection with the detailed specification to follow.

DESCRIPTION OF THE PREFERRED EMBODIMENT

Figure 1:
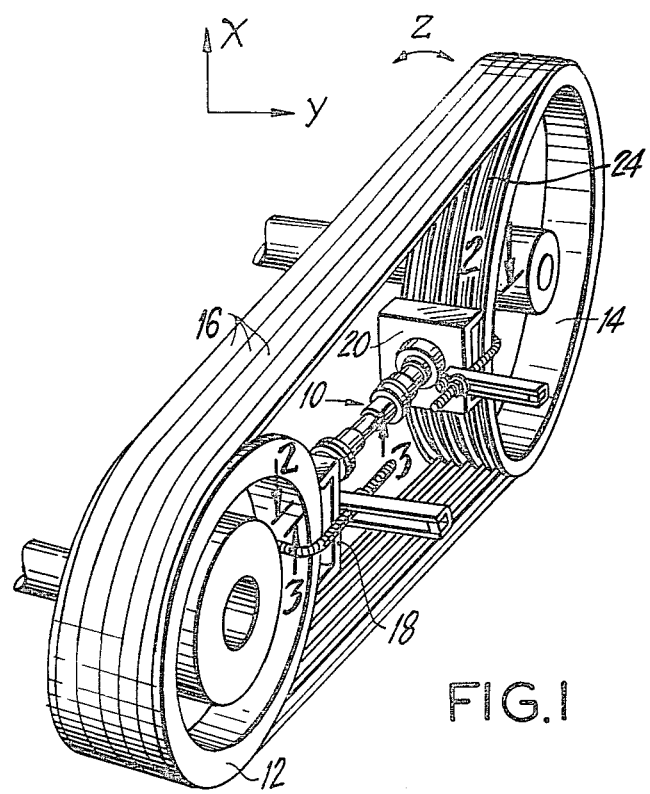
FIG. 1 is a perspective view of a pair of multiple belt pulleys which are to be aligned with the use of the alignment tool constructed in accordance with the preferred embodiment of the instant invention shown attached thereto.

The drawings illustrate an alignment tool 10 for aligning a pair of multiple groove pulleys 12, 14 to prevent excessive wear of the multiple "V" belts 16 carried thereby. Generally, "U" shaped clamps 18, 20 are secured to the faces 22, 24 of pulleys 12, 14, respectively. Clamps 18, 20 include slotted members 26, 28 which carry "L" shaped threaded rods 30, 32 which engage the inner faces 34, 37 of pulleys 12, 14, respectively. Nuts 36 and washers 38 permit adjustment of "L" shaped members 30, 32 both along the slot and longitudinally to adjust for different sizes of pulleys. Thus, when properly adjusted, clamps 18, 20 and the outer walls 40, 42 thereof, will be parallel with outer faces 22, 24 of pulleys 12, 14.

Necks 44, 46 extending from clamps 18, 20 mount rigid tubular members 48, 50 which extend normally to clamp 18, 20 and thereby normally to faces 22, 24 of pulleys 12, 14. Tubular members 48, 50 are threaded at ends 52, 54 which engage nuts 54 and washers 56 to mount same non-rotatably with respect to clamps 18, 20. Slidably mounted within tubular members 48, 50 are plungers 58, 60 which are biased by means of springs 62 in the direction of pulleys 12, 14. Plungers 56, 58 have tapered ends 64 which will engage the "V" grooves 66 of pulleys 12, 14.

Mounted to the forward portion of tubular members 48, 50 are first halves 68, 70 of universal joints 72, 74 which include annular rings 76, 78 which pivot along with the second halves 80, 82 of universal joints 74, 76. Joining universal joints 72, 74 is an adjustable link 86 formed of an inner sleeve 88 and an outer sleeve 90 which are slidably fitted together to permit the length of link 86 to be adjusted to compensate for pulleys disposed various distances apart.

Figure 2:
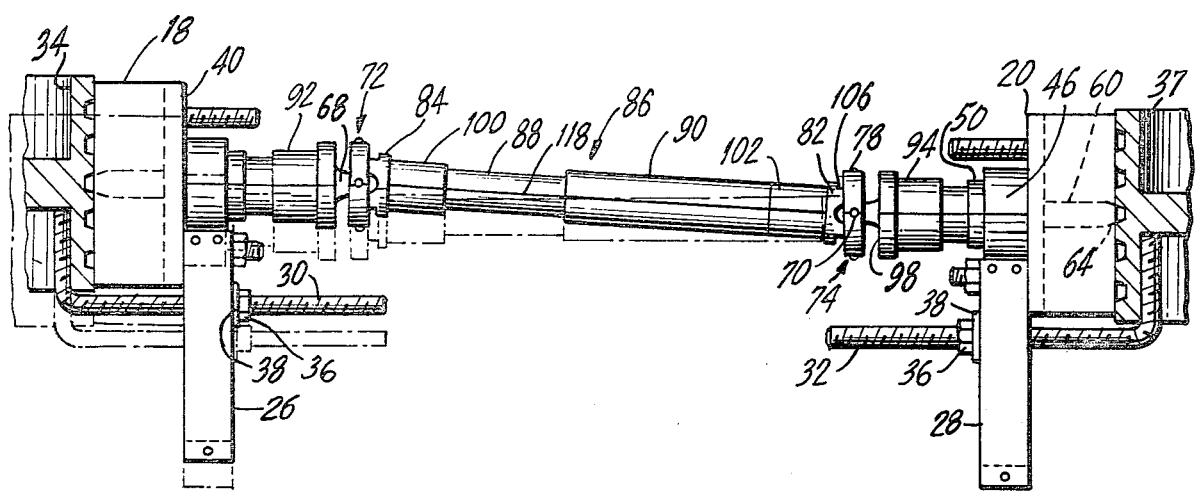
FIG. 2 is a sectional view taken along line 2—2 of FIG. 1 with the pulleys shown misaligned in solid lines and aligned in broken lines.
Figure 3:
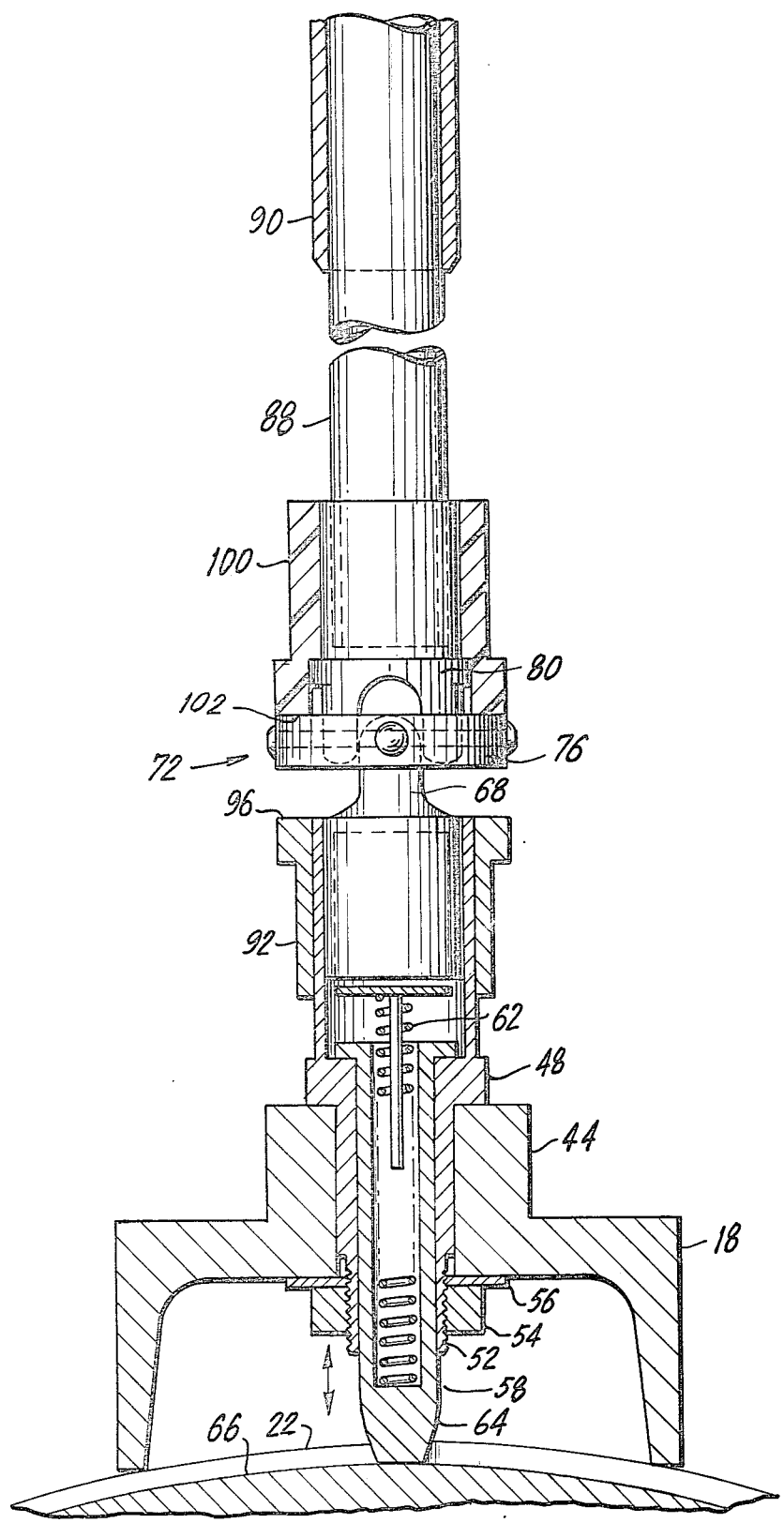
FIG. 3 is a sectional view taken along line 3—3 of FIG. 1.

A series of four slidable guides are used to indicate centerline alignment of the pulleys in two planes. Slidably mounted to member 48, 50 are first and second guides 92, 94 having faces 96, 98 disposed normally to the longitudinal axis of members 48, 50. Slidably mounted on link 86 are third and fourth guides 100, 102 having faces 104, 106, normal to the longitudinal axis of link 86 and facing guides 92, 94, respectively. Guides 92, 94, 100, 102 indicate that the centerline of pulleys 12, 14 are aligned in two planes (X—Y as shown in FIG. 1) when the faces of each opposed pair of guides 92, 100 and 94, 102 are parallel. Thus, centerline alignment is accomplished by sliding the opposed pairs of guides together until they are flush with rings 76, 78 at each face. As shown in FIG. 2 in solid lines, the pulleys 12, 14 are out of alignment, thus it will be impossible for the faces of the guides to engage flush with rings 76, 78. As shown by the broken lines, pulleys 12, 14 have been adjusted into alignment and faces 96, 98, 104, 106 of guides 92, 94, 100, 102 will fit flush against rings 76, 78.

After alignment in the two planes described above, the device is then used to perform angular alignment in the third plane (Z) to insure that the pulleys are not disposed at an angle with respect to each other. This third alignment is accomplished by the use of a scribed line 108 extending from rigid members 48, 50 through link 96. Thus, as shown in FIG. 2, scribed line 108 extends from rigid member 48 to rigid member 50 and is inscribed upon guides 92, 94, 102, 100 and portions 88 and 90 of link 86. Since the position of line 108 on non-rotatable members 48, 50 is fixed, these portions of line 108 will not align if pulleys 12, 14 are angularly disposed with respect to each other.

After alignment in the X—Y planes as described above, the operator will check line 108 to determine angular alignment. If the portions of line 108 align, pulleys 12 and 14 will then be angularly aligned. If alignment of the portions of line 108 is not possible, pulleys 12 and 14 must be then angularly aligned. After this third alignment, pulleys 12 and 14 will be aligned in the three planes required to prevent excessive belt wear. Thus, it is seen that the alignment tool constructed in accordance with the preferred embodiment of the instant invention provides a simple method for critical alignment of belt pulleys in three planes.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. An alignment tool for aligning a pair of pulleys comprising:
    (a) first and second clamping means attached to the face of the first and second pulleys;
    (b) first and second members mounted to said first and second clamping means, said first and second members constructed and arranged to extend normally to the face of said first and second pulleys;
    (c) first and second universal joints disposed on the ends of said first and second members;
    (d) a link joining said first and second universal joints;
    (e) first and second slidable guides disposed on said first and second members, said first and second guides having a face normal to said first and second members;
    (f) third and fourth guides slidably disposed on said link, each said member having a face normal to said link and oppositely disposed to said faces of said first and second guides;
    (g) said guides thereby indicating centerline alignment of said first and second pulleys when each said face of said guide is parallel to the other of said faces of said guides.

2. The tool as claimed in claim 1 further including a line inscribed on said first and second members and said link, said line thereby indicating angular alignment of said pulleys when said line is aligned.

3. The alignment tool as claimed in claim 1 wherein said pulleys include grooves for engagement with belts and further including means disposed on said first and second clamp means for engaging at least one of said grooves of said pulleys.

4. The alignment tool as claimed in claim 3, wherein said means for engaging said groove includes a plunger slidably disposed within said first and second member, said plunger being biased into engagement with at least one of said groove of said pulley.

5. The alignment tool as claimed in claim 1, wherein said link is adjustable in length.

* * * * *